Patented May 13, 1930

1,758,518

UNITED STATES PATENT OFFICE

JOHANN JAKOB, OF SEEBACH-ZURICH, SWITZERLAND, ASSIGNOR TO ALBERT T. OTTO & SONS, INC., OF NEW YORK, N. Y., A CORPORATION OF NEW YORK

PROCESS FOR THE PRODUCTION OF ARTIFICIAL STONES

No Drawing. Application filed November 2, 1925, Serial No. 66,395, and in Germany December 22, 1924.

The present invention relates to a new and improved process for the production of artificial stones by fusing the components.

The new process consists in that silicic acid or compounds of silicic acid are fused with such inorganic salts disassociating in the heat and being easily decomposed by the former, the acid radical escaping as a gas.

Preferably such salts are made use of which facilitate the fusing process such as given by way of examples hereinafter.

Forsterite is pure magnesium olivine and in composition corresponds to the formula $Mg_2SiO_4$. Great difficulty is encountered in the technical manufacture of this compound as its melting point is situated in the neighbourhood of $1890\pm20°$. Serpentine and magnesia are used as the initial materials according to the following equation:

$$Si_2O_9Mg_3H_4 + MgO = 2Mg_2SiO_4 + 2H_2O$$

which give a quantitative yield of forsterite on melting the corresponding mixture. The disadvantages of this method are first, that serpentine has a high melting point or only becomes liquid at high temperatures, and second that magnesia sublimes and therefore escapes at relatively low temperatures (far below its melting point).

These difficulties can be overcome if care is taken to obtain a thin liquid melt which is already reactive at relatively low temperatures ($1000°-1500°$); in this way the magnesium oxide is retained in the melt. This result is achieved according to this invention by using a sulphate of the metal concerned. Divalent or trivalent metals are employed and the method is applicable not only to the production of mono-ortho silicates but to any silicates which are more basic than an equimolecular mixture of the mono-ortho-silicate and the diorthosilicate i. e.

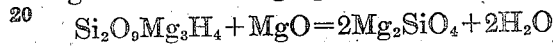

where $R''$ represents a divalent metal or metals and $R'''$ a trivalent metal or metals. The sulphate may be melted with silica or silicate less basic than that finally desired or a mixture of these.

The method is carried out in practice in the following manner. Dehydrated $MgSO_4$ is taken as initial material instead of $MgO$ or $MgCO_3$ and previously powdered quartz sand instead of serpentine. Magnesium sulphate forms a mixture of relatively low melting point with powdered quartz sand, the melting point of the melt rising continuously up to the melting point of $Mg_2SiO_4$ by continuous evolution of $SO_3$ or $(SO_2+O)$. The reaction is as follows:

$$2MgSO_4 + SiO_2 = Mg_2SiO_4 + 2SO_3$$

In order to reduce the evolution of $SO_3$ gas as far as possible an equivalent mixture of serpentine and magnesium sulphate may be used continuously after a large amount of forsterite melt has already been formed.

In the above specification of forsterite $Mg_2SiO_4$ has been given. The same method can however be used for all silicates of the type $R''_2SiO_4$ and $R''_2SiO_4.SiO_2$ in which $R''$ may stand for any suitable divalent metal.

Example 1. 4 kg. of dehydrated magnesium sulphate are intimately mixed with 1 kg. of powdered quartz sand and melted together, forsterite being formed according to the equation:

$$2MgSO_4 + SiO_2 = Mg_2SiO_4 + 2SO_3$$

2. 4 kg. of ground serpentine are mixed with 1.730 kg. of dehydrated magnesium sulphate and melted, forsterite being formed according to the equation:

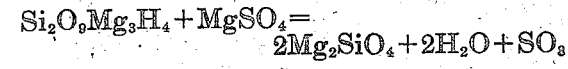

3. Processes 1 and 2 may be combined.

4. 4 kg. of ground serpentine are mixed with 1.215 kg. magnesium carbonate and 2 kg. ammonium sulphate and melted together.

Forsterite is formed according to the equation:

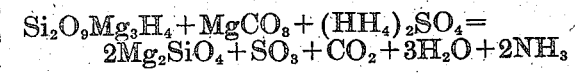

Basic sulphates or basic sulphates mixed with oxides of metals can also be used provided that the thin liquid melt is obtained.

In a similar manner artificial diopside may be produced. Diopside is a magnesium-calcium-silicate and in its stochiometric composition corresponds to the formula: $MgCa(SiO_4SiO_2)$. Pure diopside has a melting point of 1391° C. it may be produced by fusing calcium carbonate, magnesium carbonate and quartz according to the equation:

$$MgCO_3 + CaCO_3 + 2SiO_2 = MgCa(SiO_4SiO_2) + 2CO_2$$

The same product may be obtained by fusing dolomite and quartz.

Artificial stones produced in the manner described have the properties of diopside, they resist acids and alkaline solutions, as well as mechanical tension and pressure.

It will be understood that the fused mass will be permitted to cool in a suitable mould which will give to the artificial stone the desired shape and size.

Having now particularly described and ascertained the nature of my said invention and in what manner the same is to be performed, I declare that what I claim is:—

1. The process of producing an artificial forsterite which includes the step of fusing a mixture of serpentine and magnesium sulphate, the acid radical of the sulphate escaping as a gas.

2. The process of producing an artificial forsterite including the steps of fusing a mixture of quartz and magnesium sulphate, adding to the fused mass equivalent parts of serpentine and magnesium sulphate, and further heating the added materials to effect their fusion.

3. The process of forming an artificial stone which includes the step of fusing a material rich in silicic acid and an inorganic salt having an alkali earth metal base and an acid radical which separates and passes off as a gas during the fusing.

In witness whereof I affix my signature.

JOHANN JAKOB.